United States Patent
Wallace et al.

[11] Patent Number: 6,070,247
[45] Date of Patent: May 30, 2000

[54] METHOD AND APPARATUS FOR CONTROLLING POWER TO A MULTI-MEDIA CONFERENCING SYSTEM USING ANY ONE OF A SYSTEM POWER SWITCH AND A COMPUTER

[75] Inventors: Steven J. Wallace, Waco; Donald J. Martin, Belton; Thomas Grimm; Keith L. Perrin, both of Temple; Kevin D. Davis, Belton, all of Tex.

[73] Assignee: Smart Technologies Inc., Canada

[21] Appl. No.: 08/760,120

[22] Filed: Dec. 3, 1996

[51] Int. Cl.[7] ...................................................... G06F 1/26
[52] U.S. Cl. ........................... 713/300; 353/122; 361/683
[58] Field of Search .............. 353/122; 395/750–750.08; 361/683–686

[56] References Cited

U.S. PATENT DOCUMENTS

| | | | |
|---|---|---|---|
| 4,880,303 | 11/1989 | Grunwald | 353/122 |
| 5,041,965 | 8/1991 | Chen | 395/893 |
| 5,187,510 | 2/1993 | Vogeley et al. | 353/122 |
| 5,218,389 | 6/1993 | Harlon et al. | 353/122 |
| 5,231,434 | 7/1993 | Kennedy et al. | 353/122 |
| 5,289,045 | 2/1994 | Lavin et al. | 307/64 |
| 5,359,540 | 10/1994 | Ortiz | 364/528.3 |
| 5,389,963 | 2/1995 | Lepley et al. | 348/7 |
| 5,497,373 | 3/1996 | Hulen et al. | 370/79 |
| 5,528,263 | 6/1996 | Platzker et al. | 345/156 |
| 5,561,811 | 10/1996 | Bier | 395/825 |
| 5,568,963 | 10/1996 | Bennett et al. | 353/122 |
| 5,577,208 | 11/1996 | Couturier | 395/200 |
| 5,603,038 | 2/1997 | Crump et al. | 395/750 |
| 5,608,851 | 3/1997 | Leavy et al. | 364/514 |
| 5,625,829 | 4/1997 | Gephardt et al. | 395/800 |
| 5,642,517 | 6/1997 | Shirato | 395/750 |
| 5,657,096 | 8/1997 | Lukacs | 348/585 |
| 5,664,859 | 9/1997 | Salerno et al. | 353/119 |
| 5,668,695 | 9/1997 | Nakamura et al. | 361/683 |
| 5,675,814 | 10/1997 | Pearce | 395/750.06 |
| 5,713,024 | 1/1998 | Halladay | 395/712 |
| 5,715,021 | 2/1998 | Gibeau et al. | 348/750 |
| 5,721,934 | 2/1998 | Scheurich | 713/320 |
| 5,764,547 | 6/1998 | Bilich et al. | 73/321 |
| 5,802,281 | 9/1998 | Clapp et al. | 395/200 |

*Primary Examiner*—Paul R. Myers
*Assistant Examiner*—Sumati Lefkowitz
*Attorney, Agent, or Firm*—Fitzpatrick, Cella, Harper & Scinto

[57] ABSTRACT

A multi-media conferencing system (10) that links desirable conferencing components into an adaptable and functional whole through innovative system approaches to system level controls. Another object of the present invention is to provide a multi-media conferencing system (10) that integrates equipment to present information in the most desirable way as determined by the presenter and allows for system power to be turned on and off by a single system button power button (48) and by a system computer (30).

42 Claims, 17 Drawing Sheets

METHOD AND APPARATUS FOR CONTROLLING POWER TO A MULTI-MEDIA CONFERENCING SYSTEM USING ANY ONE OF A SYSTEM POWER SWITCH AND A COMPUTER

BACKGROUND OF THE INVENTION

1. Field of the Invention

This invention relates to a conference room communication system, and more particularly to a multi-media conferencing system comprising a complete communication system that links desirable conferencing components into an adaptable, portable, and functional whole through innovative system approach to system level controls.

2. Description of the Related Art

Current conference room communication systems are either very expensive and complicated and inconvenient to operate, crude and inadequate, or non-existent. State of the art conference room communication systems typically include a large display screen; a ceiling or permanent visual display system; a separate room containing an audio amplifier system, one or more visual projection systems, video equipment, audio equipment, etc. Such state of the art conference rooms are complicated to operate, usually requiring the services of an experienced av presentation technician, and are very expensive to create, maintain, operate, and/or lease.

The majority of the remaining existing conference rooms are technology challenged. Of the existing conference rooms having at least some conferencing technology, the technology is usually an assortment of one or more items such as a video projector; a pull-down or set up screen; a pointing stick or infrared pointer; an audio amplifier; a video tape player; an overhead projector, a personal computer, etc., all typically assembled on an adhoc basis for a specific conference or presentation. The assembly of components is labor intensive, unsightly due to multiple cables running along the floor (which may also be a hazard—tripping over the cables) and over each other, inconvenient for a presenter to use, and it always seems that one desirable component is missing or unavailable. There is a need for something better.

SUMMARY OF THE INVENTION

In view of the above problems associated with the related art, it is an object of the present invention to provide a multi-media conferencing system that links desirable conferencing components into an adaptable, portable, and functional whole through innovative system approaches to system level controls. Another object of the present invention is to provide a multimedia conferencing system that integrates equipment to present information in the most desirable way as determined by the presenter and allows for system power to be turned on and off by a single system button power button and by a system computer.

BRIEF DESCRIPTION OF THE DRAWINGS

The novel features believed characteristic of the invention are set forth in the appended claims. The invention itself, however, as well as other features and advantages thereof, will be best understood by reference to the detailed description with follows, read in conjunction with the accompanying drawings, wherein:

DETAILED DESCRIPTION OF PREFERRED EMBODIMENTS

Figure 1:
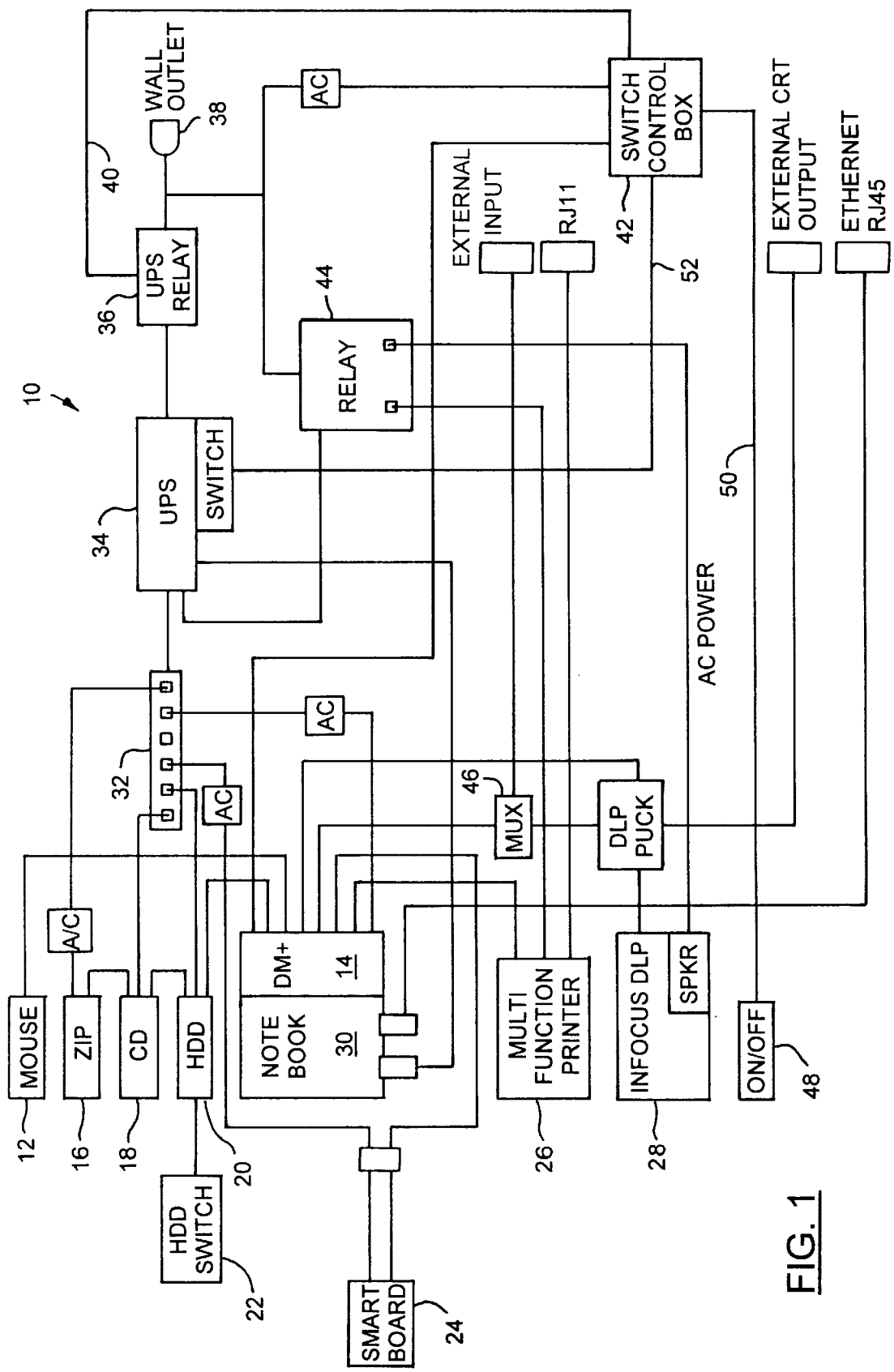
FIG. 1 is a system level block diagram of a multi-media conferencing system according to a preferred embodiment of the invention.

FIG. 1 is a system level block diagram of a multi-media conferencing system 10 according to a preferred embodiment of the invention. The interconnection of each component within the system is self-explanatory. Mouse 12 is coupled to a computer docking station 14. A ZIP drive 16 is coupled to a CD rom drive 18, which is coupled to an auxiliary hard disk drive HDD 20, which is coupled to computer docking station 14. HDD 20 has a switch 22 mounted on the surface of HDD 20, or is coupled to a switch 22 remotely mounted at another more user convenient location within the system.

An optional smart board 24 is coupled to docking station 14. A multi-function printer 26 is coupled to docking station 14 and to a fax/modem line. A video projector 28 is coupled to docking station 14 via mux 46. A video signal from video projector 28 is projected onto optional smart board 24, or onto an overhead screen, set up screen, flat wall surface or other projection surface if smart board 24 is not used. Mux 46 is also coupled to receive an external RCB input. A notebook computer 30 is coupled to docking station 14. ZIP drive 16, CD rom drive 18, hard disk drive 20, docking station 14 and smart board 20 all receive their power from the protected power output 32 of an uninterruptable power supply UPS 34. A UPS relay 36 couples power from an AC wall outlet 38 to the power input of UPS 34. UPS relay 36 also has a signal line 40 for providing a UPS relay control signal to a switch control box 42. Switch control box 42 and a relay 44 are both coupled to receive power from AC wall outlet 38. Relay 44 further receives power from a protected power output from UPS 34. A PCMCIA serial line of notebook 30 is coupled to UPS 34 and a NET output of notebook 30 is coupled to an ethernet RJ45. A system on/off switch 48 is coupled to switch control box 42 via switch input line 50. Switch control box 42 is also coupled to UPS 34 via switch out line 52. 48 provides switch input to switch control box 42. Multi-function printer 26 and video projector 28 both receive their power from respective power outputs of relay 44.

When switch 48 is actuated, a flip-flop (7474) in switch control box 42 is set. Switch control box 42 sends a signal on signal line 40 to UPS relay 36 that actuates circuitry that opens the relay within relay 36, thus shutting down power to UPS 34. UPS 34 recognizes that it has lost power input and sends a single over the "serial" line that tells the windows 95 program in notebook 30 to shut down. When Windows 95 shuts down notebook 30, the PS/2 line going from docking station 14 to switch control box 42 loses the 5-volt signal, which presets the flip-flop (7474) in switch control box 42, which restores the UPS AC input, and there is also a little one shot flip-flop that generates a pulse to the MC switch circuitry in UPS 34, which turns off the UPS when the 5-volts signal goes down, thus completing the cycle.

In a preferred embodiment of the invention, mouse 12 is the Point Pro wireless mouse available from Gyro. ZIP drive 16 is an Iomega ZIP drive. CD-rom drive 18 is an NEC 8X external CD-rom reader. External hard disk drive HDD 20 is an IB ultrastar ES 216 MG hard drive. HDD 20 is used to reboot the hard disk drive in notebook 30. Auxiliary back-up HDD 20 is programmed at the factory with an operating system (With at least Windows 95 in this embodiment and perhaps Microsoft's Net Meeting) and all the software that system 10 requires to operate and cannot be reprogrammed by a user of system 10. HDD 20 has a button that, when actuatuated, initiates an autoexecute program in HDD 20 which sends an image copy of HDD 20's memory to the hard disk drive in notebook 30, which restores the HDD in notebook 30. HDD 20 shuts itself off automatically after rebooting notebook 30. HDD 20 may be used to reboot notebook 30 after long periods of notebook storage, after one system user has made a presentation and before another system user is to make a presentation, or if the software in notebook 30 has somehow been altered, erased or messed up by a user.

Optional smart board 24 is a Smart Technologies smart board model 585. Smart board 24 is coupled to notebook 30 via docking station 14 and the DM+ serial line. The smart board is an interactive board that provides communication between the smart board and the notebook. Multi-function printer 26 is a HP office jet printer model 350 which is a printer, fax machine and has a scanner. Video projector 28 is an Infocus Litepro model 620 digital light processing projector. The DLP Puck comes with the model 620. Notebook computer 30 is a Texas Instruments model TM6020 notebook computer loaded with Microsoft's Windows 95 operating system and MS Office. Notebook computer contains an inserted PCMCIA dual serial card from Quatech and a Connectware ISDN fax/modem/analog/digital card.

Figure 2:
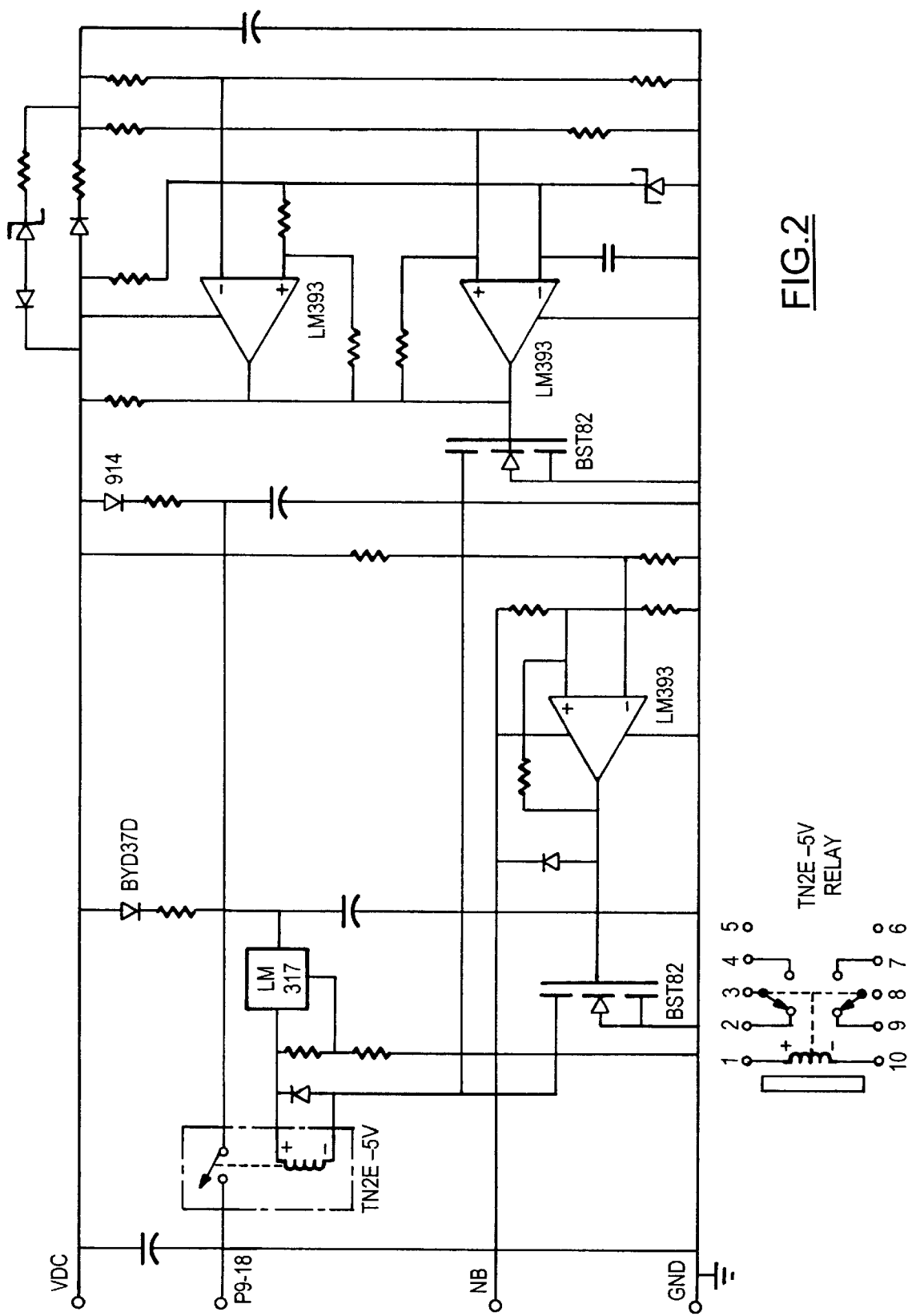
FIG. 2 is an electrical schematic diagram of a modification to a Texas Instruments Dockmate Plus in accordance to a preferred embodiment of the invention

Docking station 14 is a Texas Instruments Dockmate Plus modified in accordance with the electrical schematic shown in FIG. 2. The modification to the Dockmate Plus provides a circuit that sends a turn-on signal to the computer 30 when docking station 14 first receives power from UPS 34 and sends a turn-off signal to computer 30 when docking station 14 first loses power from UPS 34. The TM 6020 has a software controlled on/off power switch that is responsive to the on/off signal sent from the modified Dockmate Plus. UPS 34 is an APC model BK280B which includes parachute software that is loaded onto notebook 30. The parachute software monitors the serial port and talks to the serial port. When the program detects a shut down signal, it signals the Windows 95 program to shut down. UPS 34 has a momentary contact switch MC that, when actuated, turns on the UPS (if off previously) or off (if on previously). When turned on, UPS 34 generates AC output which is converted to DC voltage for driving the docking station 14 and notebook 30. UPS relay 36, relay 44 and switch control box 42 were all specifically designed for multi-media conferenceing system 10.

When switch 48 is actuated, multi-media conferencing system 10 powers up and turns on or powers down and turns off, depending on whether the system is on or off when the switch is actuated. Notebook 30 may also turn on or turn off system 10. The windows 95 program loaded in notebook 30 has system shut down software that is responsive to actuation of a system shutdown icon. Actuation of the system shut down icon will shutdown notebook 30 and power to the entire system 10. Notebook 30 may also be used to turn on power to system 10. When the on/off button on notebook 30 is actuated, notebook 30 will turn on using battery power for the short time it takes for power to entire system 10 to be activated. As a result, system 10 can be turned on or off from notebook 30 or from switch 48.

Figure 3:
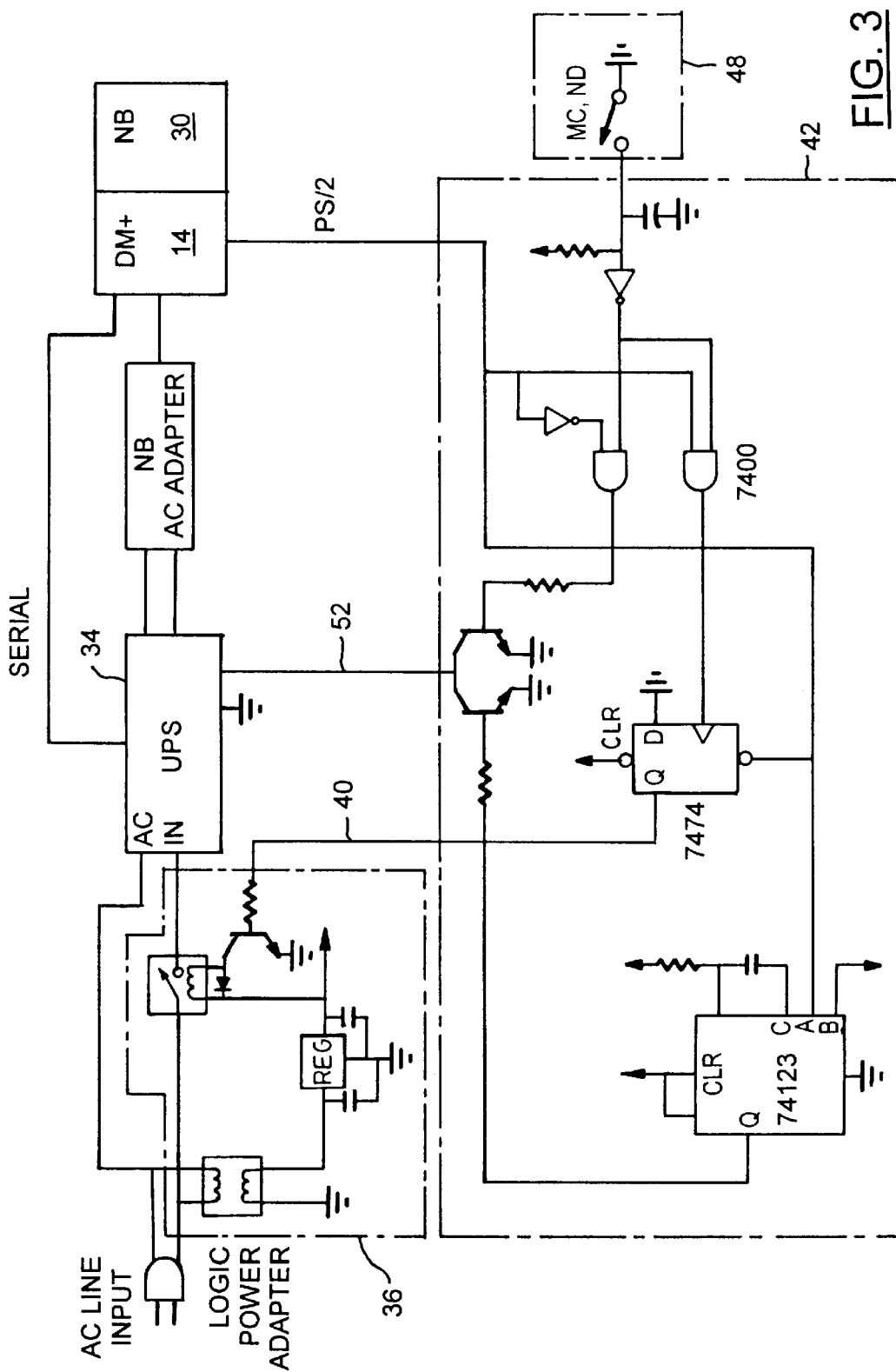
FIG. 3 is a schematic diagram of the power up/power down circuit for multi-media conferenceing system 10.

FIG. 3 is a schematic diagram of the power up/power down circuit for multi-media conferenceing system 10. FIG. 3 includes the electrical schematic diagrams of UPS relay 36 and switch control box 42. UPS relay 36 controls whether or not UPS 34 gets AC power. Switch control box 42 controls UPS relay 36. Switch control box 42 receives 9 volts DC to operate and 5 volts from the docking station 14/notebook computer 30. Switch 48 is a momentary contact push-button switch that activates switch control box 42 to turn-on or turn-off system 10.

Figure 4:
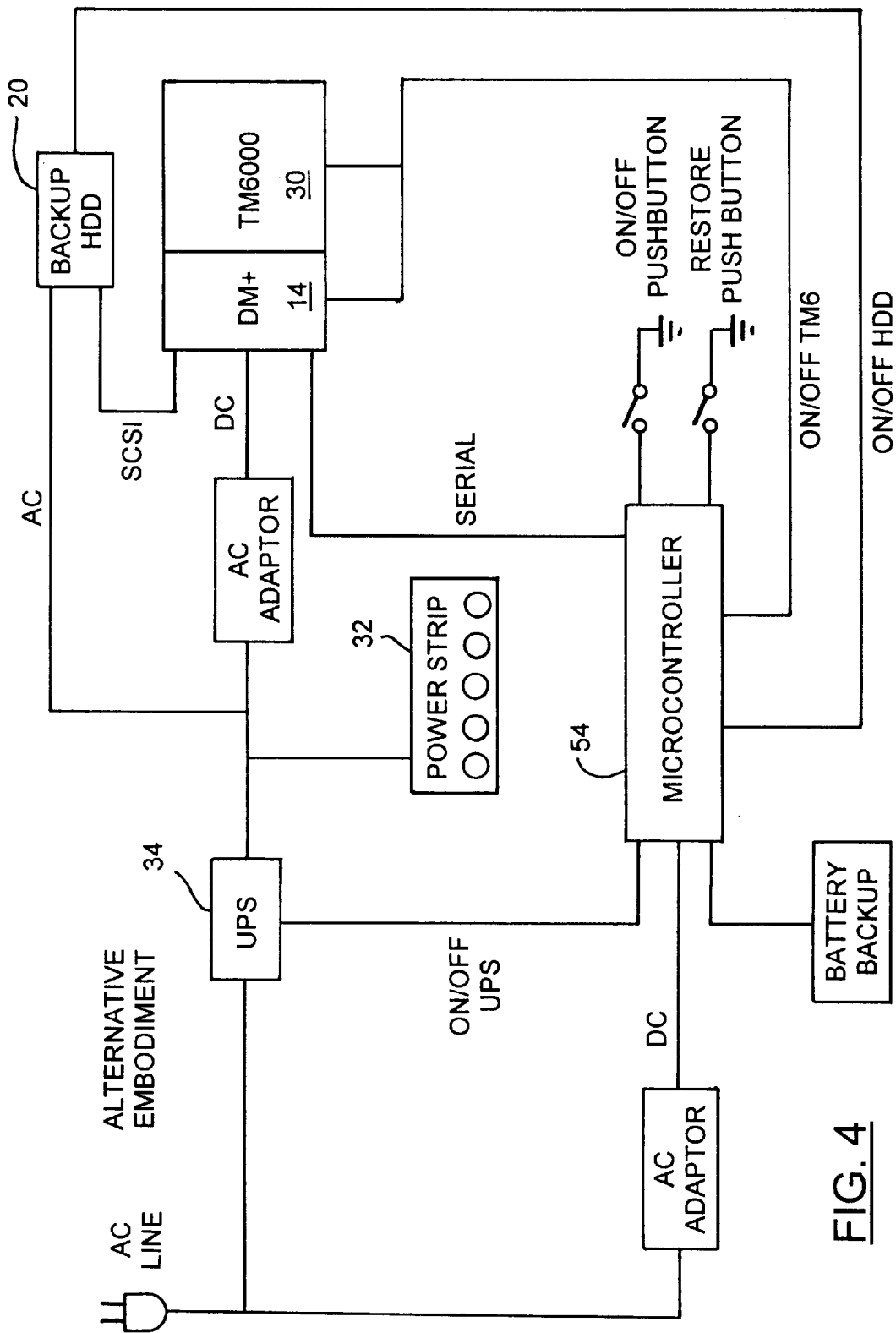
FIG. 4 is a schematic diagram of a power up/power down circuit according to another embodiment of the invention.

FIG. 4 is a schematic diagram of a power up/power down circuit according to another embodiment of the invention. In the embodiment of FIG. 4, a single chip microcontroller 54 replaces UPS relay 36 and switch control box 42. In this embodiment, an AC adapter that generates DC is connected to the AC line to UPS 34. The DC generated by the AC adapter operates provides the power to operate microcontroller 54. There is also a backup battery that provides operation when power is lost. Now, when UPS 34 is off and it is desirable to turn UPS 34 on, the on/off push button coupled to microcontroller 54 is actuated. Microcontroller 54 detects on/off switch actuation and determines that UPS 34 is to be turned on. Microcontroller 54 pulses a signal to UPS 34 along the on/off UPS signal line and UPS 34 turns on. Microcontroller 54 also pulses a signal to docking station 14 along the serial line that turns on notebook 14. Microcontroller 54 also allows system 10 to be turned off by notebook 30. In this embodiment, a custom software drive could be used to monitor the serial line like the parachute drive did, and the software drive would tell Windows 95 to shut down, and then turns off UPS 34. Additionally, when an operator wants to turn the system back on, he actuates the restore push button coupled to microcontroller 54. When the restore button is actuated, the system comes back on and, in addition, sends a signal to back-up hard disk drive 20 which actuates an autoexecute program in HDD 20 which sends an image copy to the hard disk drive in notebook 30, which restores the HDD in notebook 30. HDD 20 shuts itself off automatically after the backup is complete is actuated to reboot computer 30.

Figure 5:
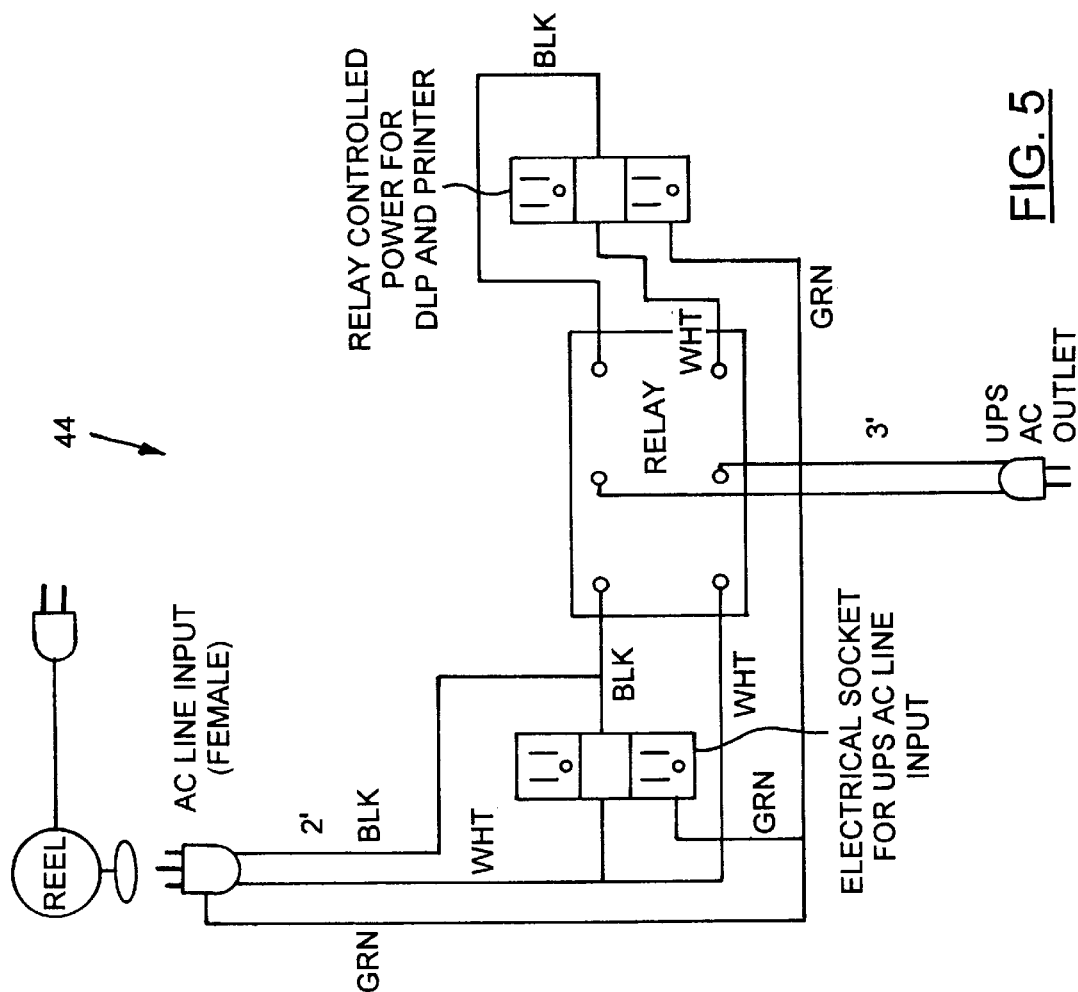
FIG. 5 is a schematic diagram of relay 44.
Figure 6:
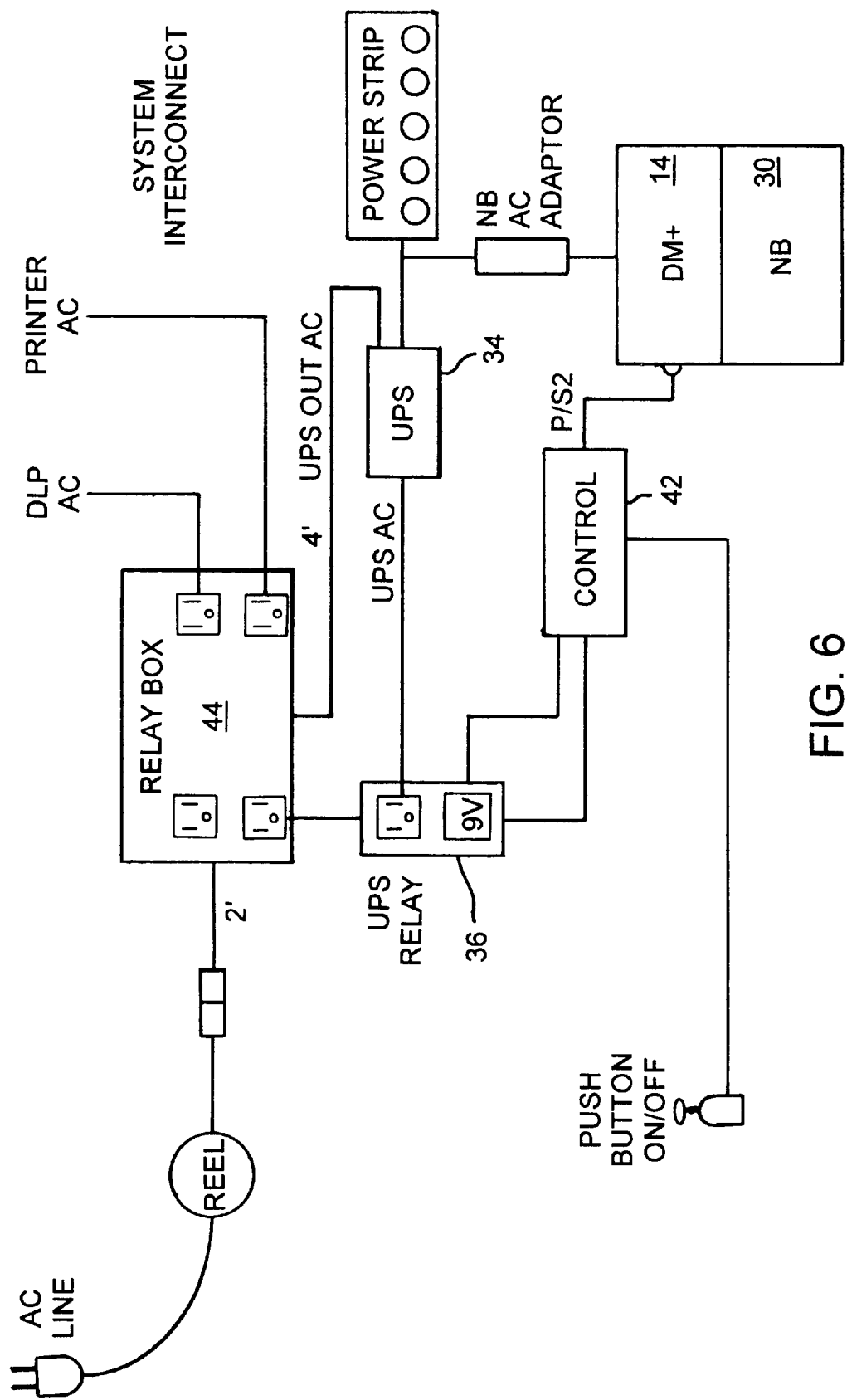
FIG. 6 is a system interconnect schematic diagram of multi-media conferenceing system 10.

FIG. 5 is a schematic diagram of relay 44. Relay 44 has an AC line coming in that receives power from wall outlet 38, an electrical outlet for providing power to UPS 34 via UPS relay 36, connection points within a relay for receiving an AC input from a UPS 34 AC outlet, and has a relay controlled electrical outlet for coupling power to printer 26 and video projector 28. FIG. 6 is a system interconnect schematic diagram of multi-media conferenceing system 10.

Figure 7:
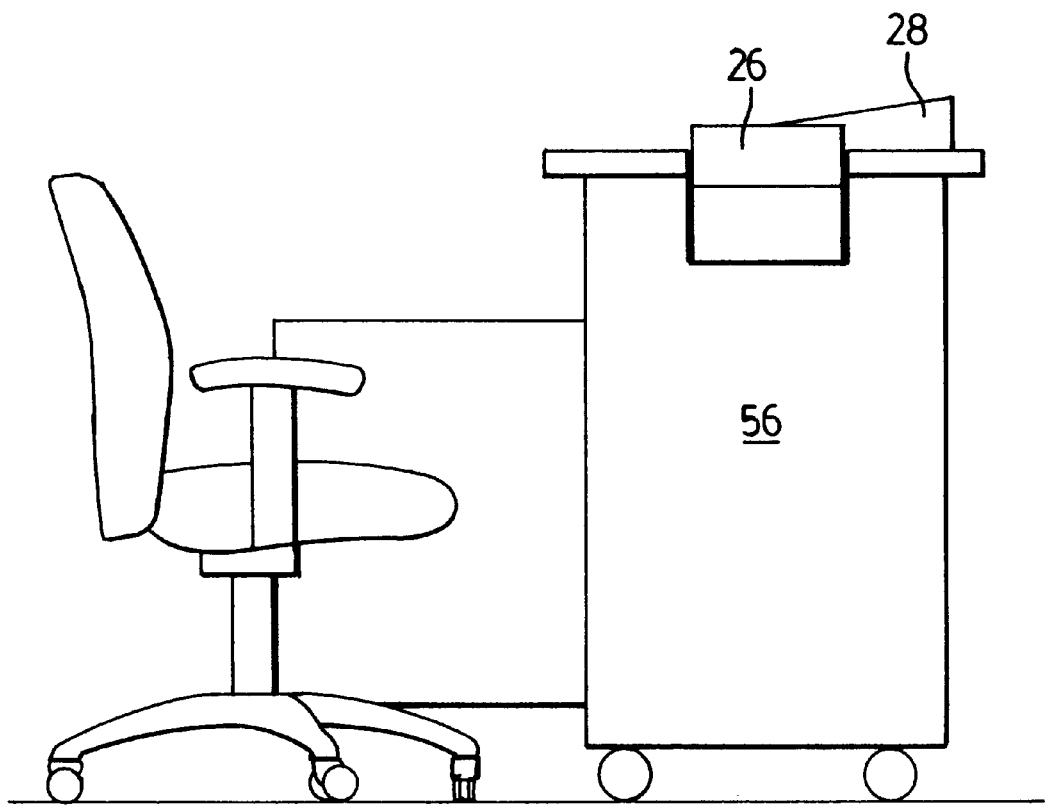
FIG. 7 is a side plan view of a cart 56 designed to accommodate multi-media conferencing system 10 in order to enable the system to be portable and convenient.
Figure 8:
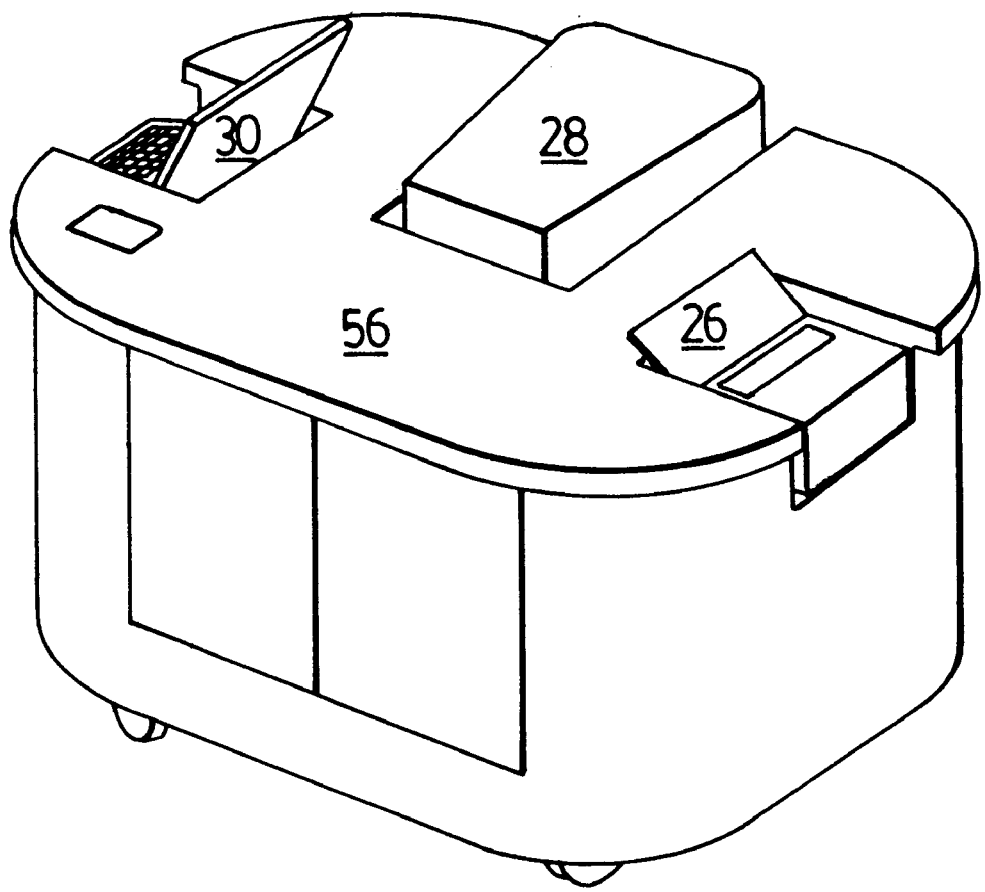
FIG. 8 is a plan view of multi-media conferencing system 10 mounted in cart 56 with notebook 30, video projector 28 and printer 26 in presentation ready position.
Figure 9:
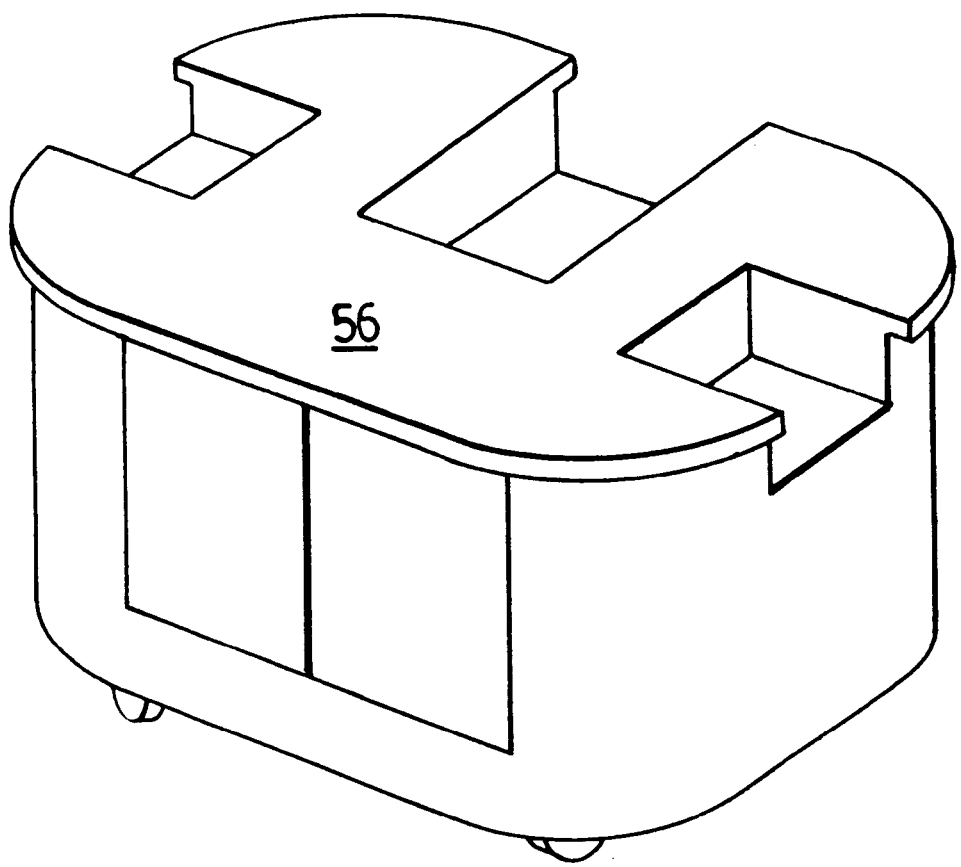
FIG. 9 is a plan view of cart 56 without notebook 30, video projector 28 and printer 26.

FIG. 7 is a side plan view of a cart 56 designed to accommodate multi-media conferencing system 10 in order to enable the system to be portable and convenient. Cart 56 must be small enough to pass through a standard door way e.g., in this embodiment, a maximum width of 30 inches was selected. Other widths could be used for applications having non-standard door widths. The length of the cart should be selected to facilitate convenient closet storage (a 40 inch length was selected in the preferred embodiment). The height of cart 56 is determined by a combination of the type of video projector used and the desired video viewing angle (also depends on ability of video projector to adjust it projection angle) and the desired position of an operator of the system (e.g. is the operator to sit or stand?—a 40 inch height was selected in the preferred embodiment). FIG. 8 is a plan view of multi-media conferencing system 10 mounted in cart 56 with notebook 30, video projector 28 and printer 26 in presentation ready position. Cart 56 includes locking covers (not shown) for covering and protecting notebook 30, video projector 28 and printer 26 when cart 56 is to be stored. FIG. 9 is a plan view of cart 56 without notebook 30, video projector 28 and printer 26.

Figure 11:
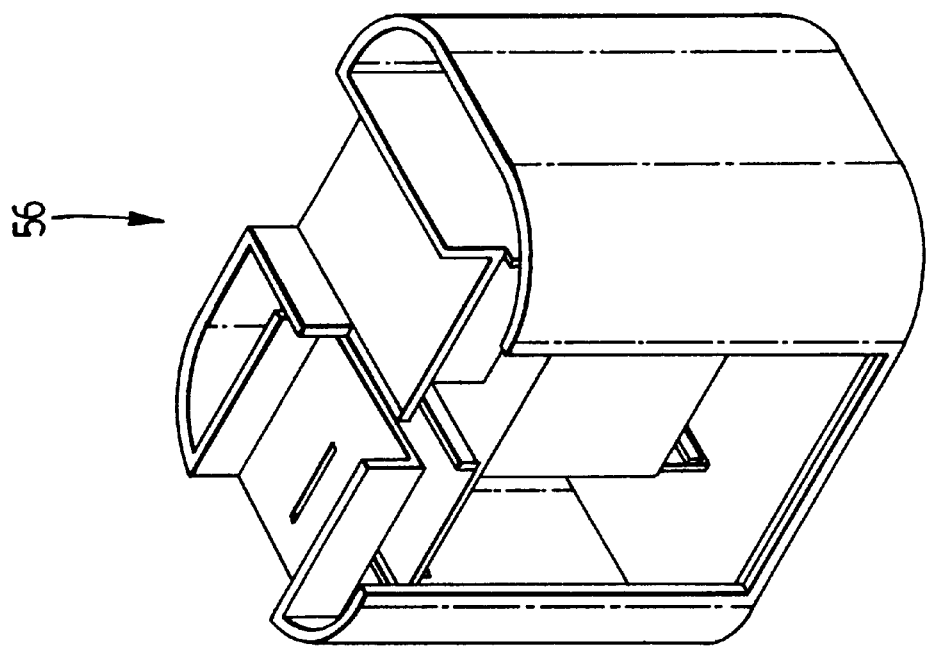
FIG. 11 is the cart 56 of FIG. 10 without the top surface.
Figure 10:
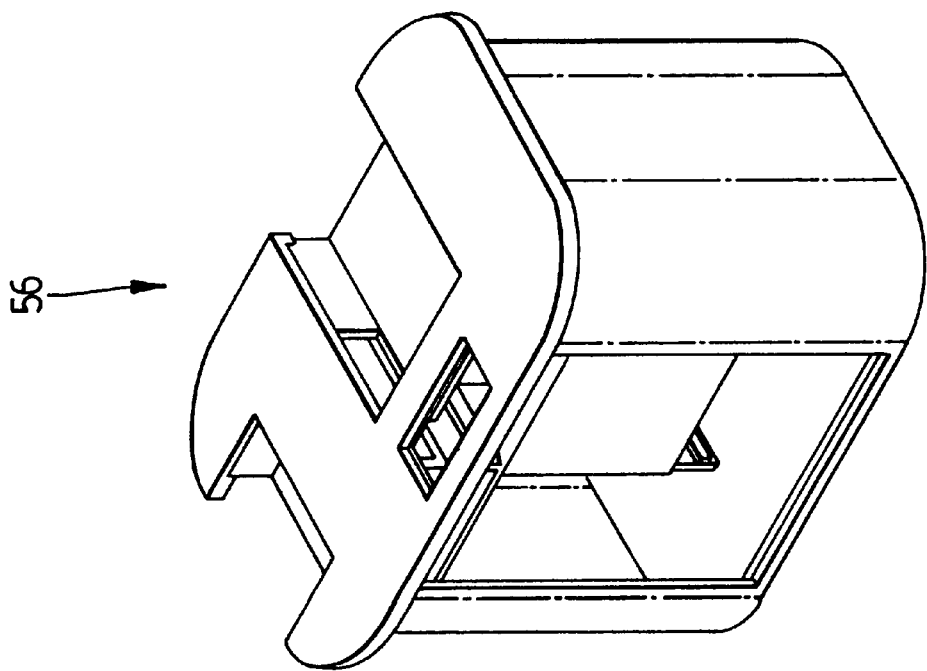
FIG. 10 is a plan view of a cart 56, according to another embodiment of the invention, without notebook 30, video projector 28, printer 26 and storage doors.
Figure 12:
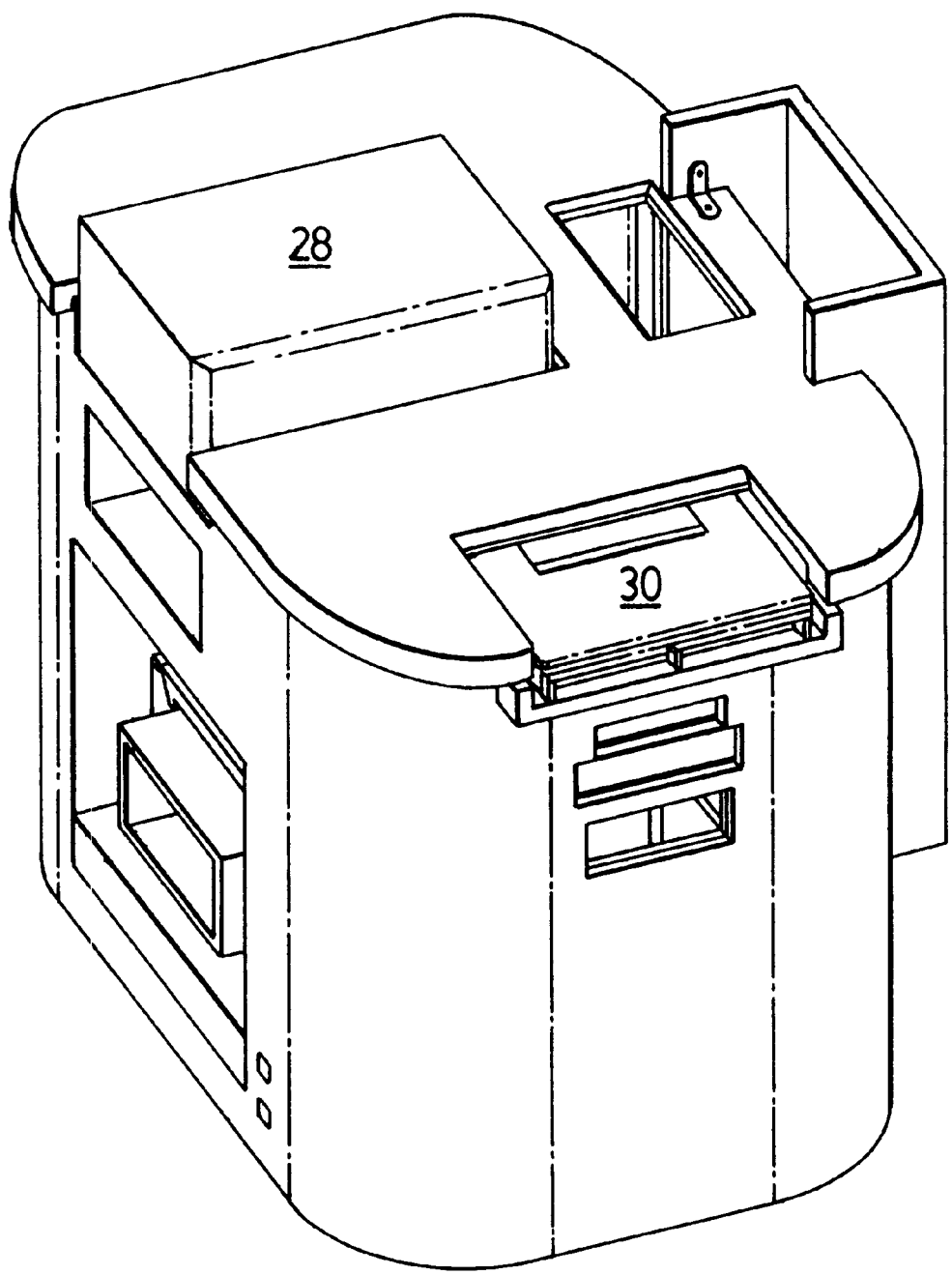
FIG. 12 is a plan view of a cart 56, according to yet another embodiment of the invention.
Figure 13:
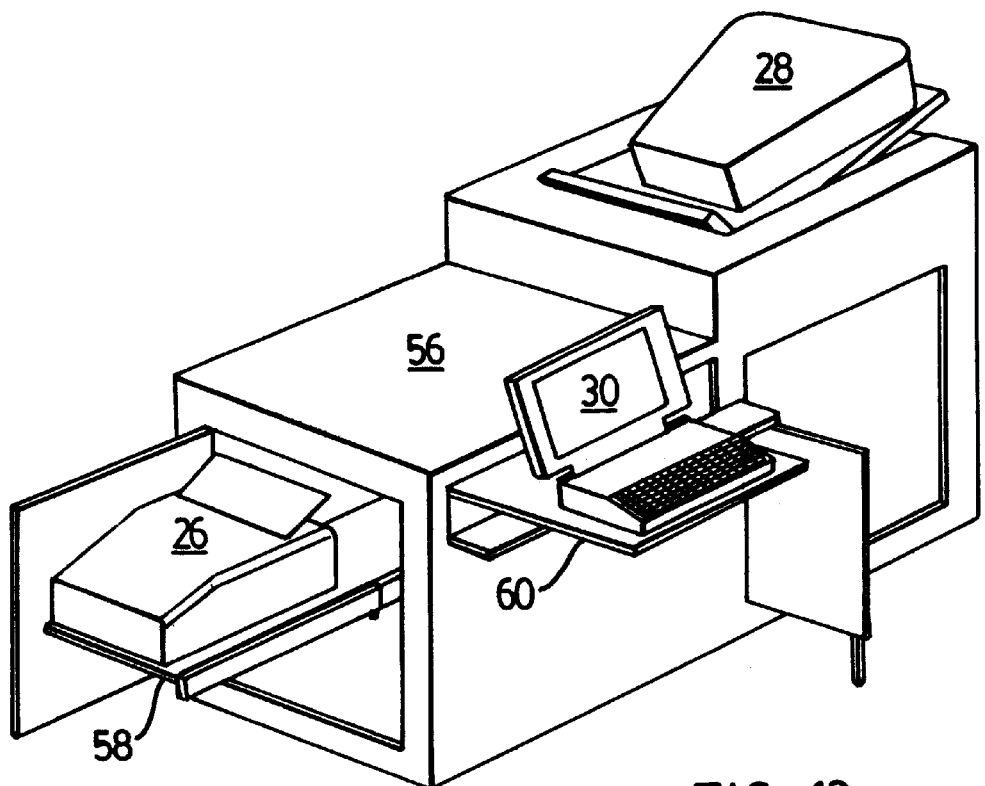
FIG. 13 is a plan view of multi-media conferencing system 10 mounted in yet another embodiment of cart 56 with notebook 30, video projector 28 and printer 26 in presentation ready position.
Figure 14:
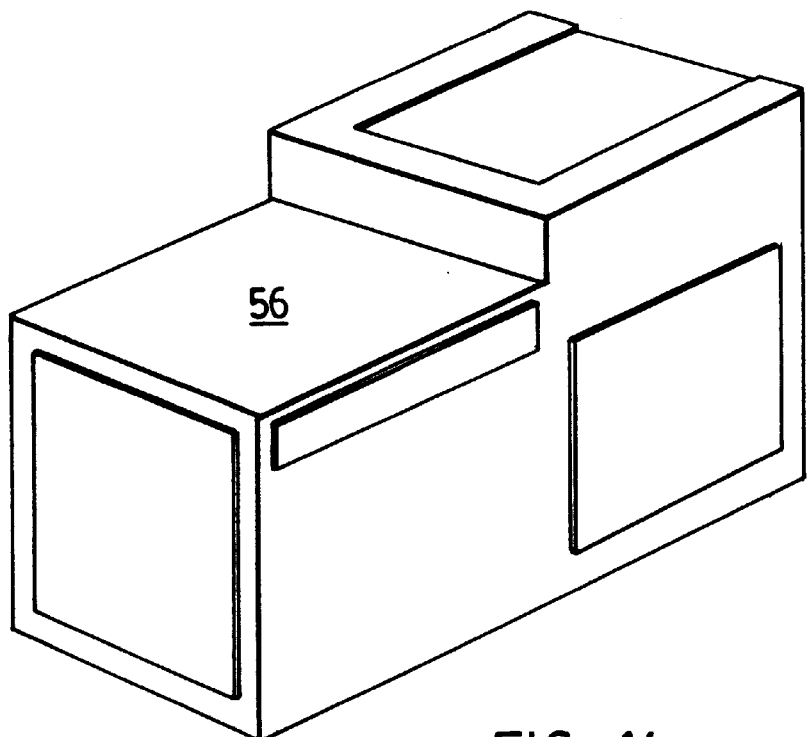
FIG. 14 is a plan view of the cart 56 of FIG. 13 with notebook 30, video projector 28 and printer 26 when cart 56 in their stored positions with the covers closed.

FIG. 10 is a plan view of a cart 56, according to another embodiment of the invention, without notebook 30, video projector 28, printer 26 and storage doors. FIG. 11 is the cart 56 of FIG. 10 without the top surface. FIG. 12 is a plan view of a cart 56, according to yet another embodiment of the invention. FIG. 13 is a plan view of multi-media conferencing system 10 mounted in yet another embodiment of cart 56 with notebook 30, video projector 28 and printer 26 in presentation ready position. Printer 26 is mounted on slidable support surface 58 and notebook 30 is mounted on slidable support surface 60. FIG. 14 is a plan view of the cart 56 of FIG. 13 with notebook 30, video projector 28 and printer 26 when cart 56 in their stored positions with the covers closed.

Figure 16:
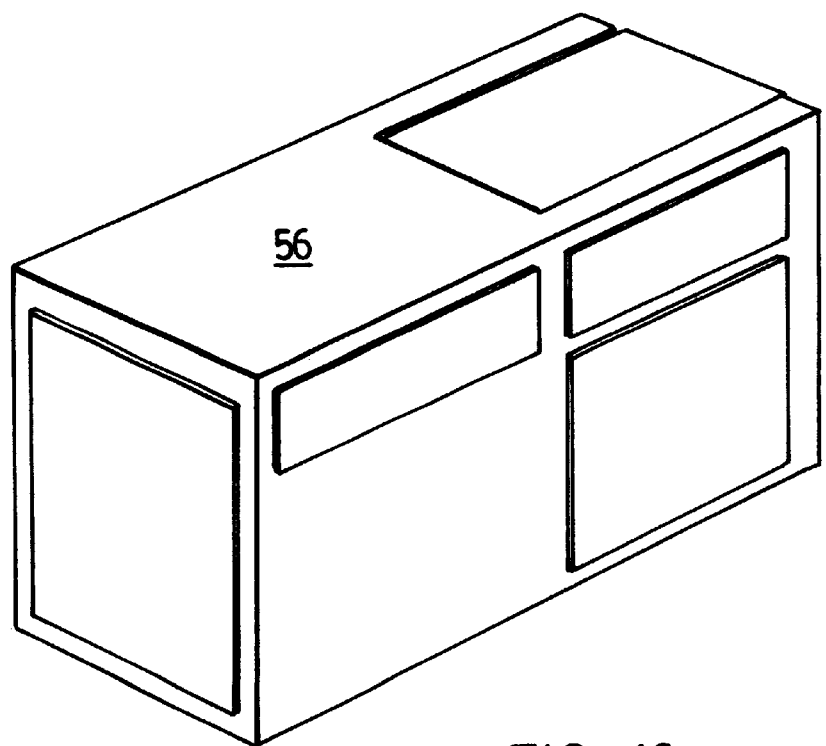
FIG. 16 is a plan view of the cart 56 of FIG. 15 with notebook 30, video projector 28 and printer 26 when cart 56 in their stored positions with the covers closed.
Figure 15:
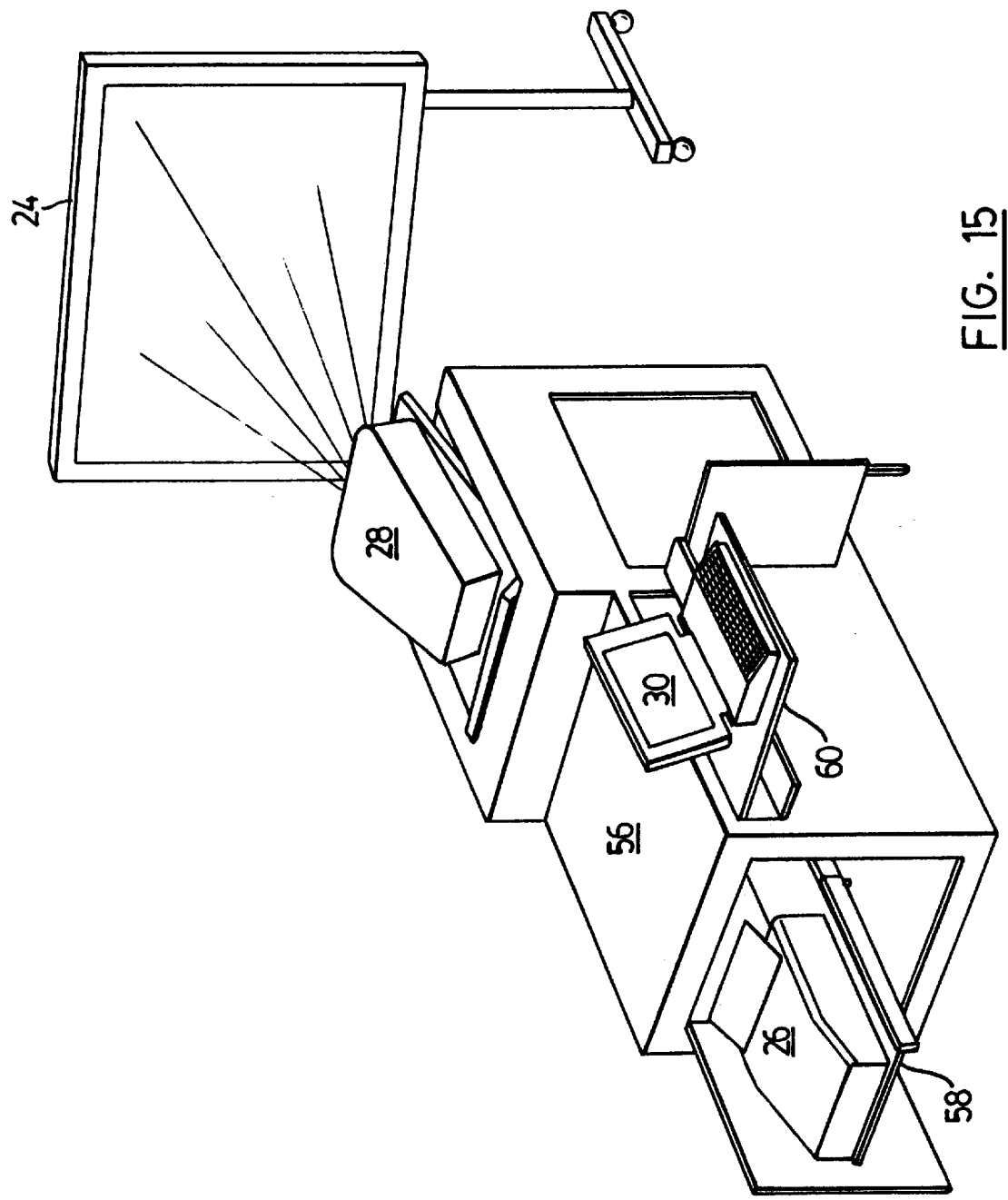
FIG. 15 is a plan view of multi-media conferencing system 10 mounted in still yet another embodiment of cart 56 with notebook 30, video projector 28 and printer 26 in presentation ready position.
Figure 17:
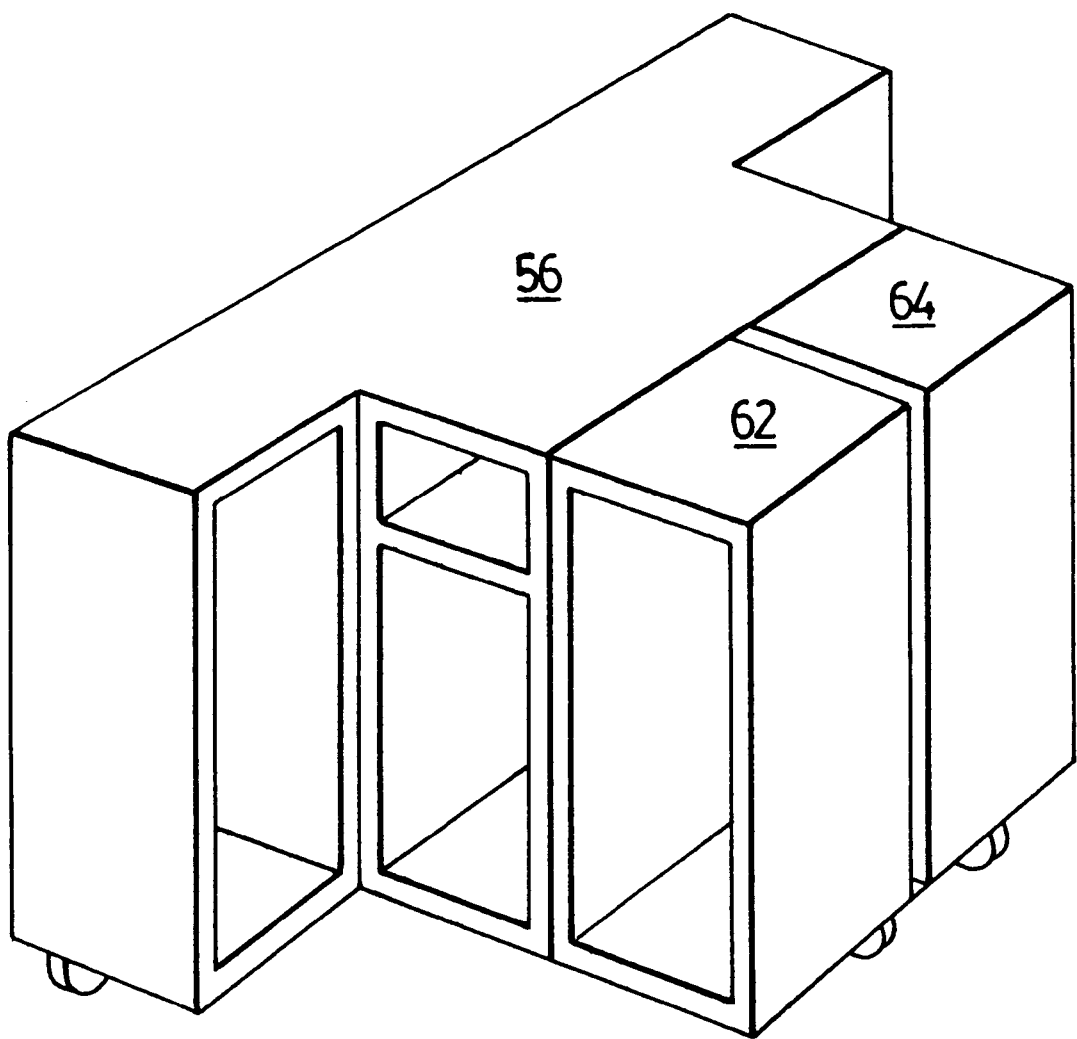
FIG. 17 is a plan view of another embodiment of cart 56.

FIG. 15 is a plan view of multi-media conferencing system 10 mounted in still yet another embodiment of cart 56 with notebook 30, video projector 28 and printer 26 in presentation ready position. Printer 26 is mounted on slidable support surface 58 and notebook 30 is mounted on slidable support surface 60. FIG. 16 is a plan view of the cart 56 of FIG. 15 with notebook 30, video projector 28 and printer 26 when cart 56 in their stored positions with the covers closed. FIG. 17 is a plan view of another embodiment of cart 56. In the embodiment of FIG. 17, portions 62 and 64 rotate from a stored position to an operational position (shown in operational position).

Figure 19:
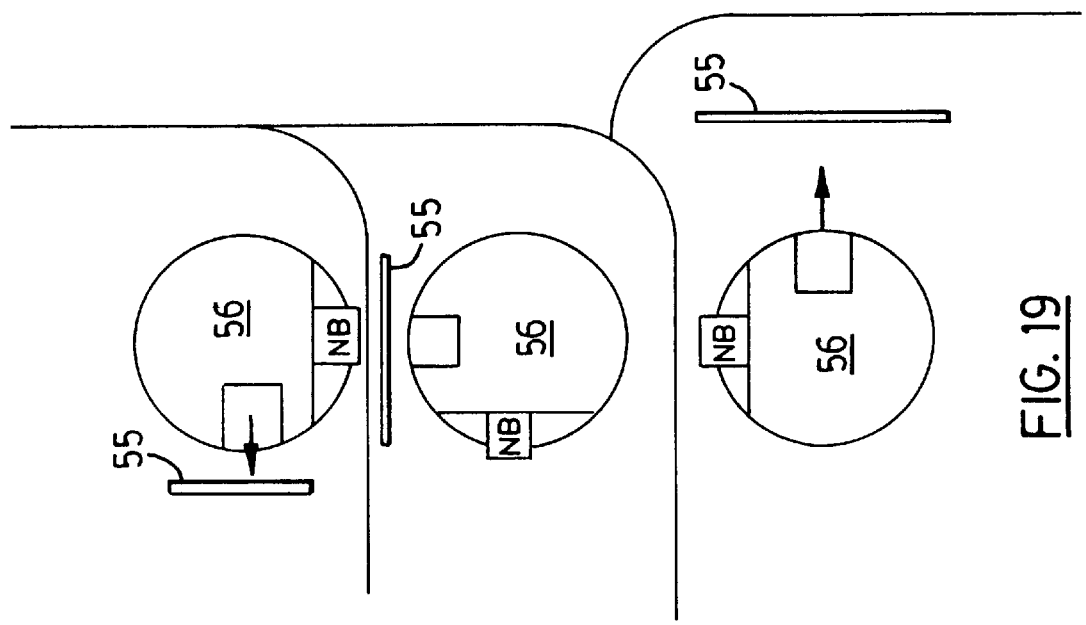
FIG. 19 is a top plan view of the round cart 56 of FIG. 18 shown projecting in three different directions.
Figure 18:
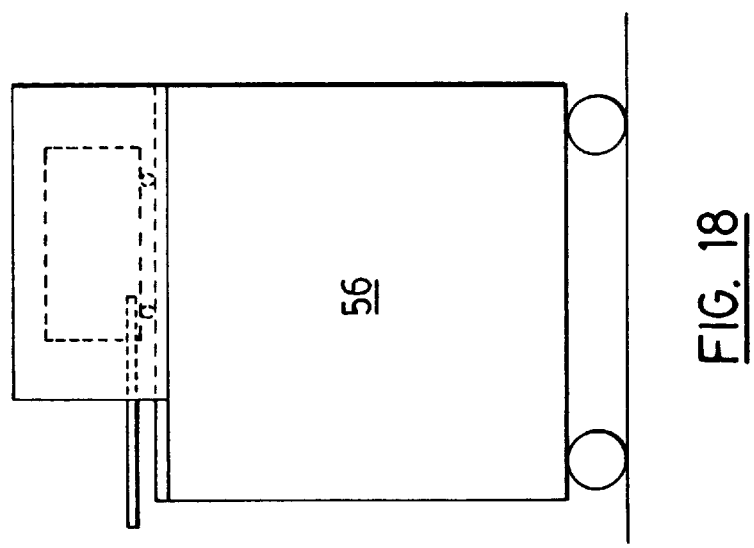
FIG. 18 is a side view of a round cart 56, according to yet still another embodiment of the invention.
Figure 20:
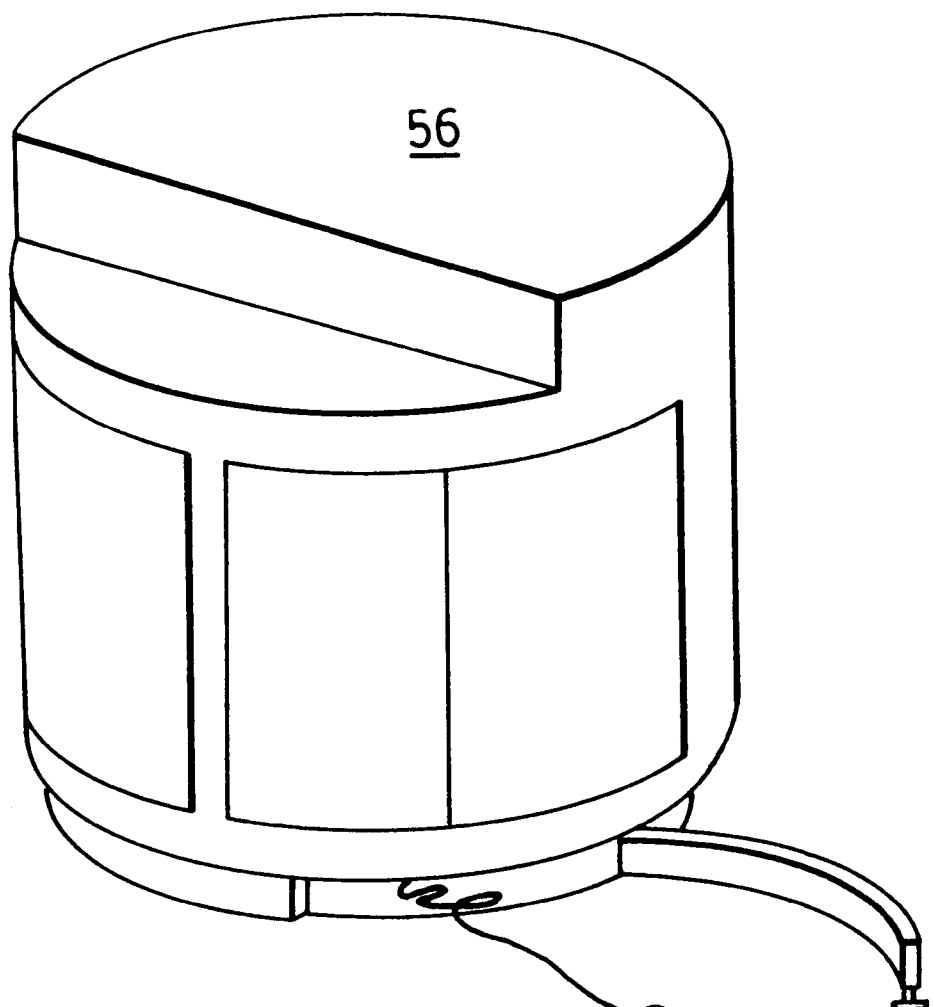
FIG. 20 is a plan view of the cart 56 of FIG. 18 with notebook 30, video projector 28 and printer 26 in their stored positions with the protective covers closed.

FIG. 18 is a side view of a round cart 56, according to yet still another embodiment of the invention. The interesting feature of the cart 56 of FIG. 18 is that a round cart facilitates easy rotation. Easy rotation makes it convenient to rotate cart 56 to facilitate projecting on multiple screens within the same room, as illustrated in FIG. 19. FIG. 20 is a plan view of the cart 56 of FIG. 18 with notebook 30, video projector 28 and printer 26 in their stored positions with the protective covers closed.

Multi-media conferencing system 10 is a self-contained and portable multi-media conferencing system. System 10 is rolled into a conference room. The protective doors (protecting the components) are unlocked and moved to their presentation positions. Depending upon the type of cart 56 ultimately used, notebook 30 and printer 26 may be slidably adjusted to their presentation positions and plugged into a convenient 110 v wall outlet makes it possible of a user of the system. Cart 56 is positioned so that video projector 28 is positioned to project an image at a smart board 24 (optional), a pull down or set up screen, or any other acceptable video projection surface. If a smart board 24 is to be used as the video projection surface, the individual setting up the system must connect the smart board's power cord to a wall outlet and its serial line to docking station 14 (Note: in a preferred embodiment of the invention, cart 56 contains a power connector and serial line connector for convenient attachment to smart board 24). A retractable power cord within cart 56 is then plugged into a convention 110 v wall outlet. On/off switch 48 is pressed thus activating multi-media conferencing system 10. System 10 is now operational. If there is any reason to believe that the operating system or software in notebook computer is compromised, actuating the switch on back-up HDD 20 will autoexecute a program in HDD 20 will send a factory image copy of the operating system and all other software required for system 10 operation to the hard disk drive in notebook 30, thus ensuring that proper operational system 10 software is in the HDD in notebook 30. The entire set up process is fast, easy, and can be performed by one having little or no skill in conferencing presentation equipment setup.

Once system 10 is on and ready, a presenter may load his presentation into notebook 30 via files (powerpoint format, lotus format, etc.) he has brought with him, or load it to notebook 30 via a LAN connection to another computer, or load it to notebook 30 via the Web—such as is possible by hooking up an ISDN or modem. The presenter is now ready to make his presentation without foils, without slides, and without having to bring in his own notebook. Wireless mouse 12 allows the presenter to walk away from notebook 30 while still having some operational control over system 10. Using a LAN connection, it is also possible to couple multiple computers together (would require software such as Microsoft's Net Meeting) and have a collaborative meeting using system 10 in which information can be sent back and forth amongst the various computers.

Smart board 24 is coupled to notebook 30. If system 10 is coupled to an external telephone line, either ISDN or regular connection, a presenter (utilizing net meeting or other conferencing software) writing on smart board 24 can convey information via the telephone lines to someone anywhere in the world. The receiving party would see on his computer screen that which is being written on smart board 24 by the presenter. Thus, this ability negates the need for video conferencing and corporate America has said they do not want video conferencing on their LANs because it takes up too much bandwidth. What they want is data conferencing. Assuming that two systems 10 where being utilized (both having smart boards 24 and running Microsoft's Net Meeting), a presenter at the first system could be writing on his smart board and have his writing displayed on the smart board of the second system via the second system's video projector. A presenter at the second system could replay to the first presenter by writing on his smart board and have his writing display on the smart board of the first system via the first system's video projector. Notes from both smart boards can be shared along with other files that may be transferred back and forth.

While several implementations of the preferred embodiment of the invention has been shown and described, various modifications and alternate embodiments will occur to those skilled in the art. As an example, while mouse 12 in the preferred embodiment of the invention is described as a Point Pro wireless mouse available from Gyro, it could be any mouse—wireless or wired. A wireless mouse was selected in the preferred embodiment for user convenience. A system user may also use the mouse on the keyboard of notebook 30, thus negating the need for external mouse 12. ZIP drive 16 is optional. A ZIP drive has memory storage capability superior to that of most presently available floppy disk drives but there is no reason a floppy disk drive could not be used in lieu of, or in combination with ZIP drive 16. ZIP drive 16 provides additional versatility to system 10. CD-rom drive 18 is optional. While CD-rom 18 is disclosed as NEC 8X external CD-rom reader may be just about any CD-rom drive having at least 8X capability.

Auxiliary back-up hard disk drive HDD 20, or its equivalent, is required in any system 10 that is to have a convenient method for backing-up or refreshing the HDD in notebook 30. While HDD 20 is described in the preferred embodiment of the invention as being an IBM ultrastar ES 216 MG hard drive, it could also be any other HDD having the ability to back up the HDD in notebook 30, or even be another type of memory storage device, so long as it has the capability of backing up the HDD in notebook 30 and is not alterable by a system user.

Optional smart board 24 is described in the preferred embodiment of the invention as being a Smart Technologies smart board model 585. Smart board 24 could also be any other interactive board that communicates with notebook 30. A set-up or pull-down screen could be used in lieu of smart board 24 where a non-interactive video display surface is to be used. While printer 26 is described in the preferred embodiment of the invention as being an HP office jet printer model 350 which is a printer, fax machine and has a scanner, printer 26 is optional. System 10 does not require a printer, fax machine or scanner. System 10 could have these components separately, in various combinations of components, or not at all. While video projector 28 is described in the preferred embodiment of the invention as being an Infocus Litepro model 620 digital light processing projector, it could just as easily be any video projector having the ability to project an image generated by notebook computer 30 onto a viewing surface.

Notebook computer 30 is described in the preferred embodiment of the invention as being a Texas Instruments model TM6020 notebook computer loaded with Microsoft's Windows 95 operating system, MS Office and perhaps MS Net Meeting. Notebook computer 30 could also be another notebook computer having similar or superior capabilities to that of the TM6020. Another TM6000 series notebook computer would have the advantage of being able to dock with docking station 14, which is a modified TI Dockmate Plus docking station. Use of a notebook computer other than a TM6000 series notebook will likely require the use of a docking station for the particular notebook selected. Such docking station will have to have the capabilities and/or functionality of the modified TI Dockmate Plus, which may require custom modification. It is also possible that a computer having the functionality of both notebook computer 30 and docking station 14 could be used in lieu of the combination of notebook 30 and docking station 14.

The preferred embodiment of the invention also discloses UPS 34 (an APC model BK280B) relay 44 and switch control box 42 as being the crucial components that control turn on and off of power to system 10. UPS 34, relay 44 and switch control box 42, or modifications, alterations and or combinations of one or more of these devices is required for the desired turn on, turn off control of system 10.

What is claimed:

1. A multi-media conferencing system, comprising:
    a video projector;
    a computer coupled to said video projector and having (i) a hard disk drive and (ii) power on/off means for commanding power on/off to both said computer and said video projector;
    a system power on/off switch for commanding power on/off to both said computer and said video projector; and
    a mechanism coupled to said computer, said video projector and said system power on/off switch, said mechanism controlling power on/off to said computer and to said video projector in response to a signal from said computer power on/off means or in response to a signal from said system power on/off switch, said mechanism turning power on to both said computer and said video projector in response to an on signal from said computer on/off means without an on signal from the system power on/off switch.

2. The multi-media conferencing system of claim 1, wherein said computer is a portable computer.

3. The multi-media conferencing system of claim 2, wherein a docking station couples said portable computer to said video projector and to said mechanism.

4. The multi-media conferencing system of claim 1, further including a mouse coupled to said computer.

5. The multi-media conferencing system of claim 1, further including an auxiliary hard disk drive having signal lines coupled to said computer and a power input line coupled to said mechanism.

6. The multi-media conferencing system of claim 1, further including a multi-function printer having signal lines coupled to said computer and a power input line coupled to said mechanism.

7. The multi-media conferencing system of claim 1, further including an interactive display board coupled to said computer.

8. The multi-media conferencing system of claim 1, wherein said mechanism comprises:
    an uninterruptable power supply relay coupling an uninterruptable power supply to AC power input; and
    a switch control box coupled to said system on/off switch, to said computer, to said uninterruptable power supply relay and to said uninterruptable power supply.

9. The multi-media conferencing system of claim 1, where said mechanism comprises an uninterruptable power supply under the control of a single-chip microcontroller.

10. The multi-media conferencing system of claim 1, wherein said mechanism comprises:

a single chip microcontroller having one input coupled to an uninterruptable power supply;

a second input coupled to said computer;

a third input coupled to said computer;

a fourth input coupled to a back-up hard disk drive;

a fifth input coupled to said system on/off switch;

a sixth input coupled to a switch, actuation of which causes a back-up hard disk drive to restore the hard disk drive in said computer; and a seventh input coupled to a battery backup.

11. The multi-media conferencing system of claim 5, wherein said mechanism couples power to said auxiliary hard disk drive in response to said mechanism receiving a turn-on signal from any one of said system on/off switch and said computer, said mechanism further decoupling power from said auxiliary hard disk drive in response to said mechanism receiving a turn-off signal from any one of said system on/off switch and said compter.

12. The multi-media conferencing system of claim 6, wherein said mechanism couples power to said printer in response to said mechanism receiving a turn-on signal from any one of said system on/off switch and said computer, said mechanism further decoupling power from said printer in response to said mechanism receiving a turn-off signal from any one of said system on/off switch and said computer.

13. A multi-media conferencing system comprising:

a video projector;

a portable computer which couples power to and decouples power from both said portable computer and said video projector;

a system on/off switch which couples power to and decouples power from both said portable computer and said video projector;

a docking station coupling said portable computer to said video projector; and a mechanism controlling power supplied to said portable computer and to said video projector, said mechanism coupling power to said portable computer and to said video projector in response to a turn-on signal from said system on/off switch or said portable computer, said mechanism further decoupling power from said portable computer and said video projector in response to a turn-off signal from said system on/off switch or said portable computer, said mechanism turning power on to both said portable computer and said video projector in response to an on signal from said portable computer without an on signal from the system power on/off switch.

14. The multi-media conferencing system of claim 13, further including an auxiliary hard disk drive having signal lines coupled to said computer and a power input line coupled to said mechanism.

15. The multi-media conferencing system of claim 13 further including a multi-function printer having signal lines coupled to said computer and a power input line coupled to said mechanism.

16. The multi-media conferencing system of claim 13, further including an interactive display board coupled to said computer.

17. The multi-media conferencing system of claim 13, wherein said mechanism comprises:

an uninterruptable power supply relay coupling an uninterruptable power supply to AC power input; and a switch control box coupled to said system on/off switch, to said computer, to said uninterruptable power supply relay and to said uninterruptable power supply.

18. The multi-media conferencing system of claim 13, where said mechanism comprises an uninterruptable power supply under the control of a single-chip microcontroller.

19. The multi-media conferencing system of claim 13, wherein said mechanism comprises:

a single chip microcontroller having one input coupled to an uninterruptable power supply;

a second input coupled to said computer;

a third input coupled to said computer;

a fourth input coupled to a back-up hard disk drive;

a fifth input coupled to said system on/off switch;

a sixth input coupled to a switch actuation of which causes a back-up hard disk drive to restore the hard disk drive in said computer; and a seventh input coupled to a battery backup.

20. A method of controlling power to a multi-media conferencing system, comprising the steps of:

providing a mechanism for coupling power to and decoupling power from both a computer and a video projector;

providing on a computer power on/off means for providing power to and decoupling power from both the computer and the video projector;

providing a system on/off switch for providing power to and decoupling power from both the computer and the video projector;

coupling power to said computer and to said video projector in response to said mechanism receiving a turn-on signal from the system on/off switch or in response to said mechanism receiving a turn-on signal from the computer power on/off means, said coupling step turning power on to both said computer and said video projector in response to the turn-on signal from said computer power on/off means without a turn-on signal from the system power on/off switch; and decoupling power from said computer and said video projector in response to said mechanism receiving a turn-off signal from said system on/off switch or in response to said mechanism receiving a turn-off signal from said computer power on/off means.

21. A portable multi-media conferencing system, comprising:

a portable cart;

a computer accommodated by said cart and having power on/off means for commanding power on/off to both said computer and a video projector;

said video projector accommodated by said cart, said video projector being coupled to said computer;

a system power on/off switch for commanding power on/off to both said computer and said video projector; and a mechanism within said cart, said mechanism being coupled to said computer, said video projector and said system power on/off switch, said mechanism controlling power on/off to said computer and to said video projector in response to a signal from said computer on/off means or in response to a signal from said system on/off switch, said mechanism turning power on to both said computer and said video projector in response to an on signal from said computer on/off means without an on signal from the system power on/off switch.

22. A system according to claim 21, further comprising a docking station which couples said computer to said video projector and to said mechanism.

23. A system according to claim 21, wherein said mechanism comprises an uninterruptable power supply under the control of a single-chip microcontroller.

24. A system according to claim 21, wherein said mechanism comprises an uninterruptable power supply relay, and a switch control box coupling said uninterruptable power supply relay to an interruptable power supply.

25. A portable multi-media conferencing system, comprising:

a portable cart;

a computer accommodated by said cart and having (i) a hard disk drive and (ii) power on/off means for commanding power on/off to both said computer and a video projector;

said video projector accommodated by said cart, said video projector being coupled to said computer;

an auxiliary hard disk drive coupled to said computer for rebooting the hard disk drive in said computer;

a system power on/off switch for commanding power on/off to both said computer and said video projector; and a mechanism within said cart, said mechanism being coupled to said computer, said video projector and said system power on/off switch, said mechanism controlling power on/off to said computer and to said video projector in response to a signal from said computer on/off means or in response to a signal from said system on/off switch, said mechanism turning power on to both said computer and said video projector in response to an on signal from said computer on/off means without an on signal from the system power on/off switch.

26. A portable multi-media conferencing system, comprising:

a portable cart;

a computer accommodated by said cart and having (i) a hard disk drive and (ii) power on/off means for commanding power on/off to both said computer and a video projector;

said video projector accommodated by said cart, said video projector being coupled to said computer;

an auxiliary hard disk drive coupled to said computer for rebooting the hard disk drive in said computer;

a system power on/off switch for commanding power on/off to both said computer and said video projector; and a mechanism within said cart, said mechanism being coupled to said computer, said video projector and said system power on/off switch, said mechanism controlling power on/off to said computer and to said video projector in response to a signal from said computer on/off means or in response to a signal from said system on/off switch.

27. A system according to claim 26, further comprising a docking station which couples said computer to said video projector, to said auxiliary hard disk drive, and to said mechanism.

28. A system according to claim 26, wherein said auxiliary hard disk drive contains a copy of an operating system and other software required for operation of said system.

29. A system according to claim 26, further comprising an interactive display board coupled to said computer.

30. A system according to claim 26, wherein said mechanism comprises an uninterruptable power supply and a switch control box coupled to said system on/off switch, to said computer, and to said uninterruptable power supply.

31. A multi-media conferencing system, comprising:

a computer having a hard disk drive, and a power on/off means for commanding power on/off to both said computer and a video projector;

said video projector coupled to said computer;

a system power on/off switch for commanding power on/off to both said computer and said video projector;

an auxiliary hard drive coupled to said computer for rebooting the hard disk drive in said computer; and a mechanism, coupled to said computer, said video projector and said system power on/off means, for controlling power on/off to said computer and to said video projector in response to a signal from said computer power on/off means or in response to a signal from said system power on/off switch, said mechanism turning power on to both said computer and said video projector in response to an on signal from said computer on/off means without an on signal from the system power on/off switch.

32. A multi-media conferencing system, comprising:

a computer having a hard disk drive, and a power on/off means for commanding power on/off to both said computer and a video projector;

said video projector being coupled to said computer;

a system power on/off switch for commanding power on/off to both said computer and said video projector;

an auxiliary hard drive coupled to said computer for rebooting the hard disk drive in said computer; and a mechanism, coupled to said computer, said video projector and said system power on/off means, for controlling power on/off to said computer and to said video projector in response to a signal from said computer power on/off means or in response to a signal from said system power on/off switch.

33. A system according to claim 32, further comprising a docking station coupling said computer to said video projector, to said auxiliary hard disk drive, and to said mechanism.

34. A system according to claim 32, wherein said auxiliary hard disk drive contains a copy of an operating system required for operation of said multi-media conferencing system.

35. A system according to claim 32, further comprising an interactive display board coupled to said computer.

36. A system according to claim 32, wherein said mechanism comprises an uninterruptable power supply relay and a switch control box coupled to said system on/off switch, and to said uninterruptable power supply relay.

37. A multi-media conferencing system comprising:

a video projector;

a portable computer having a hard disk drive, and a power on/off means for turning power on/off to both said portable computer and the video projector;

a docking station coupling said portable computer to said video projector and to an auxiliary hard disk drive, said auxiliary hard disk drive for rebooting the hard disk drive in said portable computer;

a system power on/off means for turning power on/off to both said portable computer and the video projector; and a mechanism, coupled to said portable computer, to said video projector, and to said system power on/off means, for controlling power supplied to said portable computer and to said video projector, said mechanism capable of turning power on/off to said portable computer and to said video projector in response to an on/off signal from said system on/off switch or an on/off signal from said portable computer, said mechanism turning power on to both said computer and said video projector in response to an on signal from said computer on/off means without an on signal from the system power on/off means.

38. A multi-media conferencing system comprising:

a video projector;

a portable computer having a hard disk drive, and a power on/off means for turning power on/off to both said portable computer and the video projector;

a docking station coupling said portable computer to said video projector and to an auxiliary hard disk drive, said auxiliary hard disk drive for rebooting the hard disk drive in said portable computer;

a system power on/off means for turning power on/off to both said portable computer and the video projector; and a mechanism, coupled to said portable computer, to said video projector, and to said system power on/off means, for controlling power supplied to said portable computer and to said video projector, said mechanism capable of turning power on/off to said portable computer and to said video projector in response to an on/off signal from said system on/off switch or an on/off signal from said portable computer.

39. A system according to claim 38, further comprising an auxiliary hard disk drive having signal lines coupled to said computer, and a power input line coupled to said mechanism.

40. A system according to claim 38, further comprising an interactive display board coupled to said computer.

41. A system according to claim 38, further comprising an uninterruptable power supply relay for coupling an uninterruptable power supply relay for coupling an uninterruptable power supply to said multi-media conferencing system, and a switch control box coupled to said system on/off switch, to said computer, to said uninterruptable power supply relay, and to said uninterruptable power supply.

42. A system according to claim 38, wherein said mechanism comprises an uninterruptable power supply under the control of a single-chip microcontroller.

* * * * *